United States Patent [19]

L'Archer

[11] Patent Number: 4,509,572
[45] Date of Patent: Apr. 9, 1985

[54] WOODWORKING PRESS

[76] Inventor: Germain L'Archer, 866 Lamarre St., Laprairie, Canada, J5R 1N7

[21] Appl. No.: 506,396

[22] Filed: Jun. 17, 1983

[51] Int. Cl.³ .............................. B27F 5/00; B27C 5/00
[52] U.S. Cl. ........................................ 144/84; 144/87; 144/137; 144/145 R; 409/87
[58] Field of Search ............... 74/471 R, 525; 409/87, 409/89, 124; 144/84, 87, 137, 145 A, 145 R; 408/65

[56] References Cited

U.S. PATENT DOCUMENTS

| 2,166,831 | 7/1939 | Wazac, Sr. | 144/84 |
| 2,912,879 | 11/1959 | Bannow | 74/525 |
| 4,163,465 | 8/1979 | Strong | 144/87 |

FOREIGN PATENT DOCUMENTS 256438 12/1925 Canada .
29570 9/1981 Canada .

Primary Examiner—W. D. Bray

[57] ABSTRACT

This concerns a machine press for woodworking, particularly to produce mortises and tenons, and characterized by its simple construction, yet allowing rapid and accurate operation. This woodworking press comprises a base, a first carriage slidable to and fro relative to a cutting tool, a second carriage slidable on the first carriage transversely relative to the direction of the first carriage, an actuation arm pivotally connected to the base and to the second carriage to selectively displace either carriage in its corresponding direction, a crank readily accessible to adjust the cutting tool in height with respect to the two carriages, and various abutments and adjustable stops to rapidly position the piece of wood or board, and produce the desired depth and lengths of cuts.

5 Claims, 17 Drawing Figures

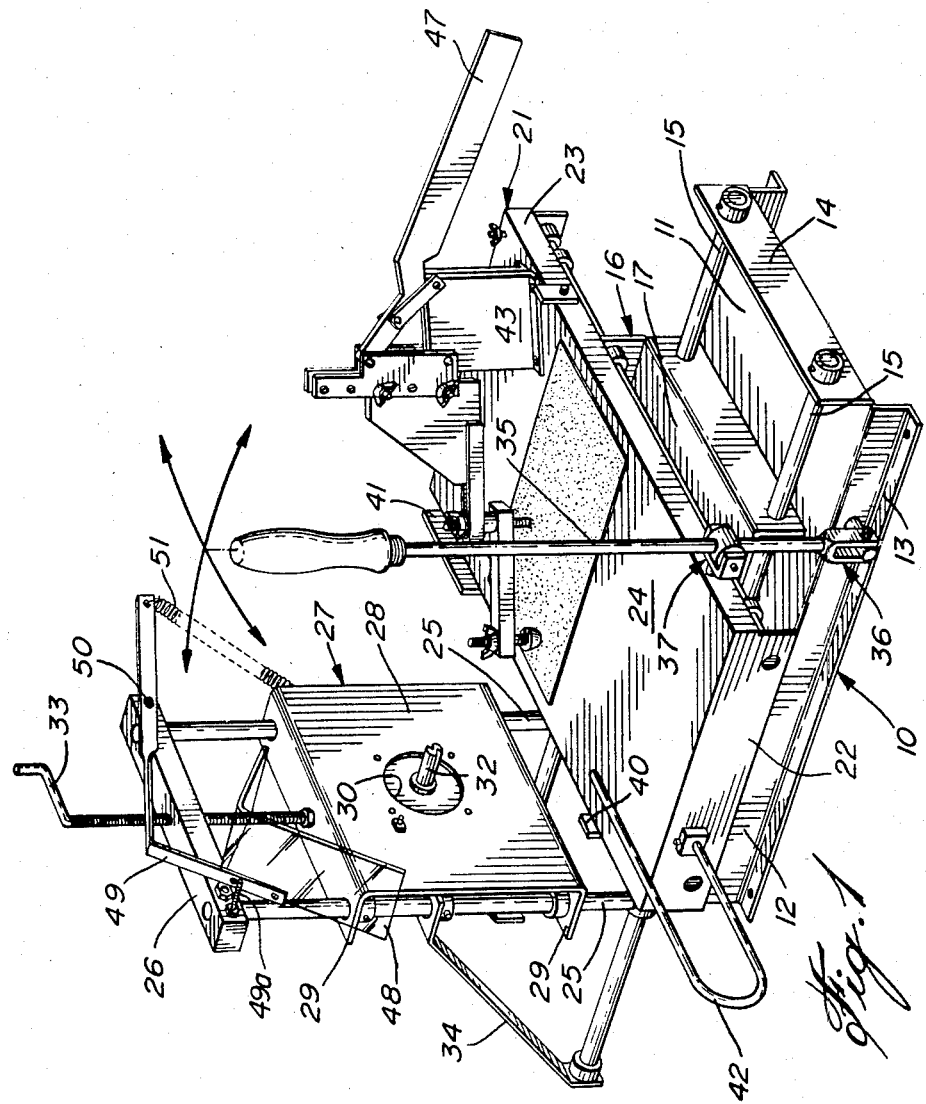

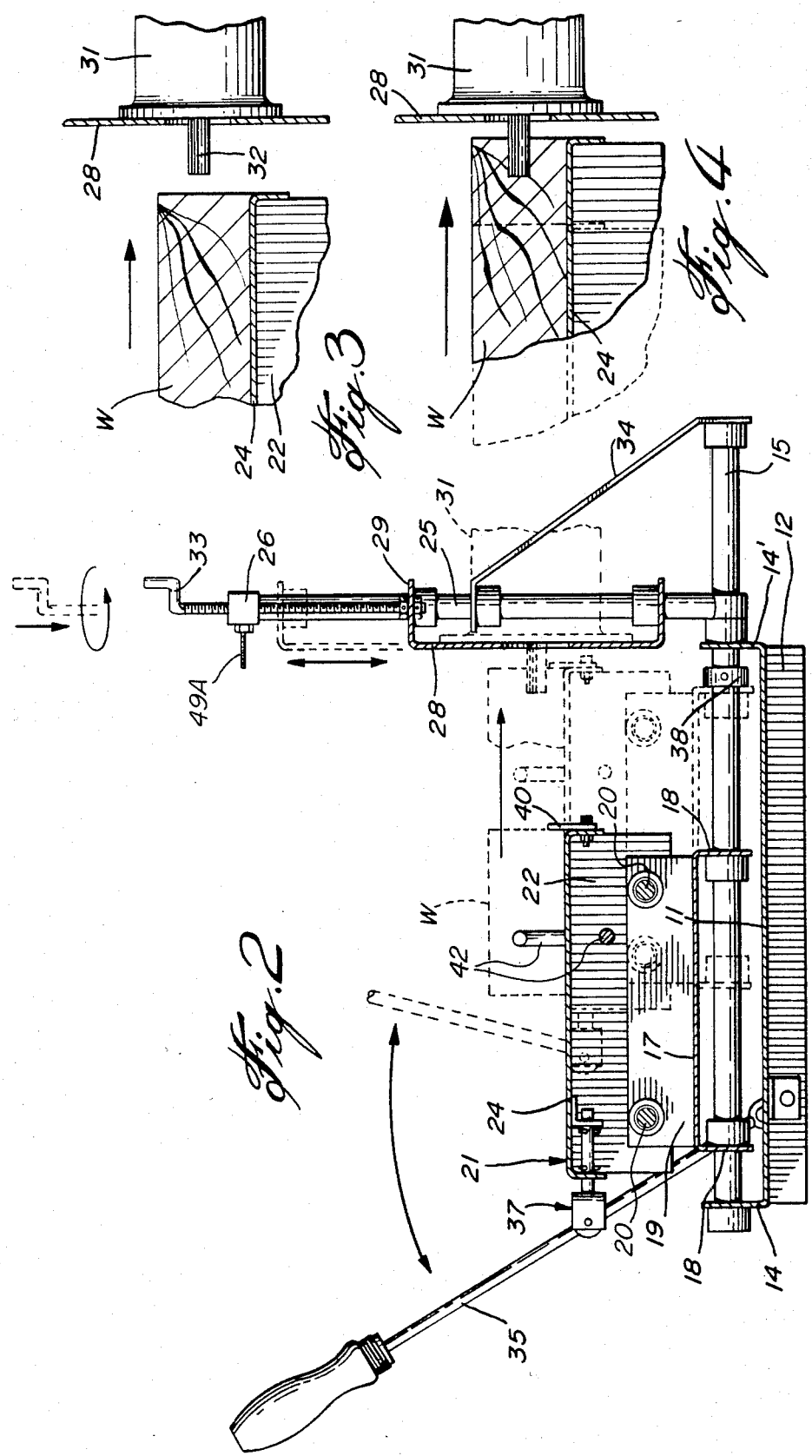

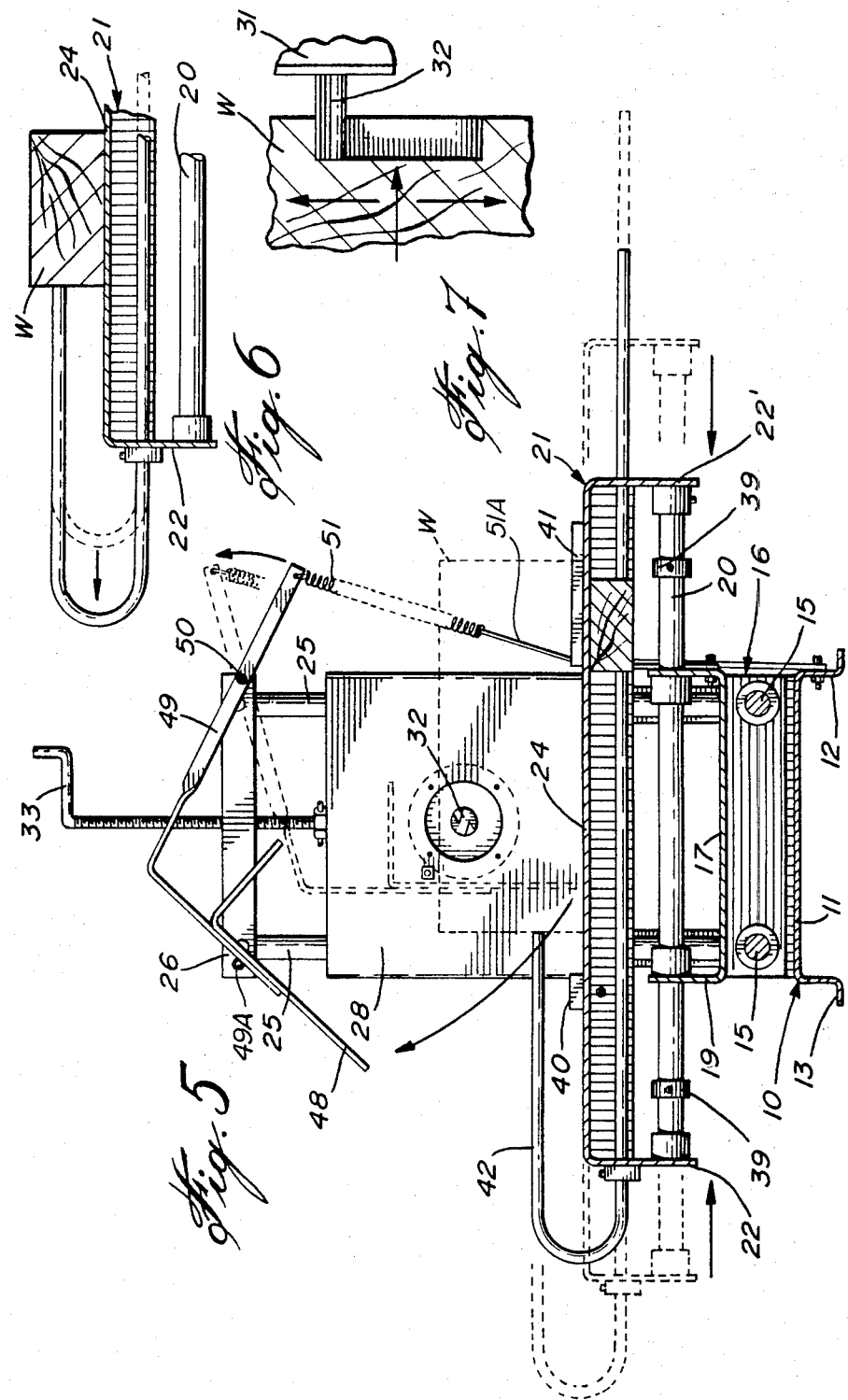

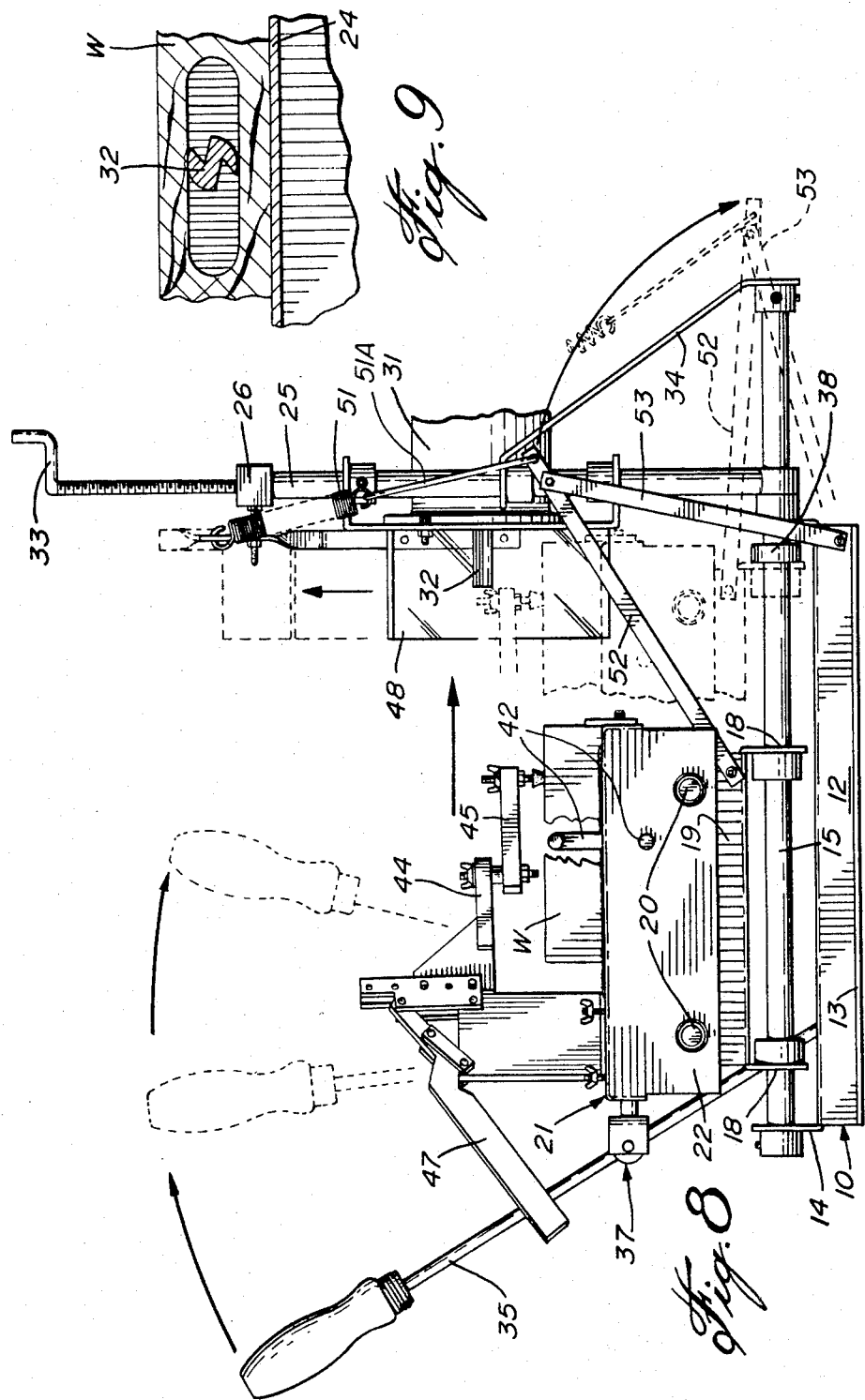

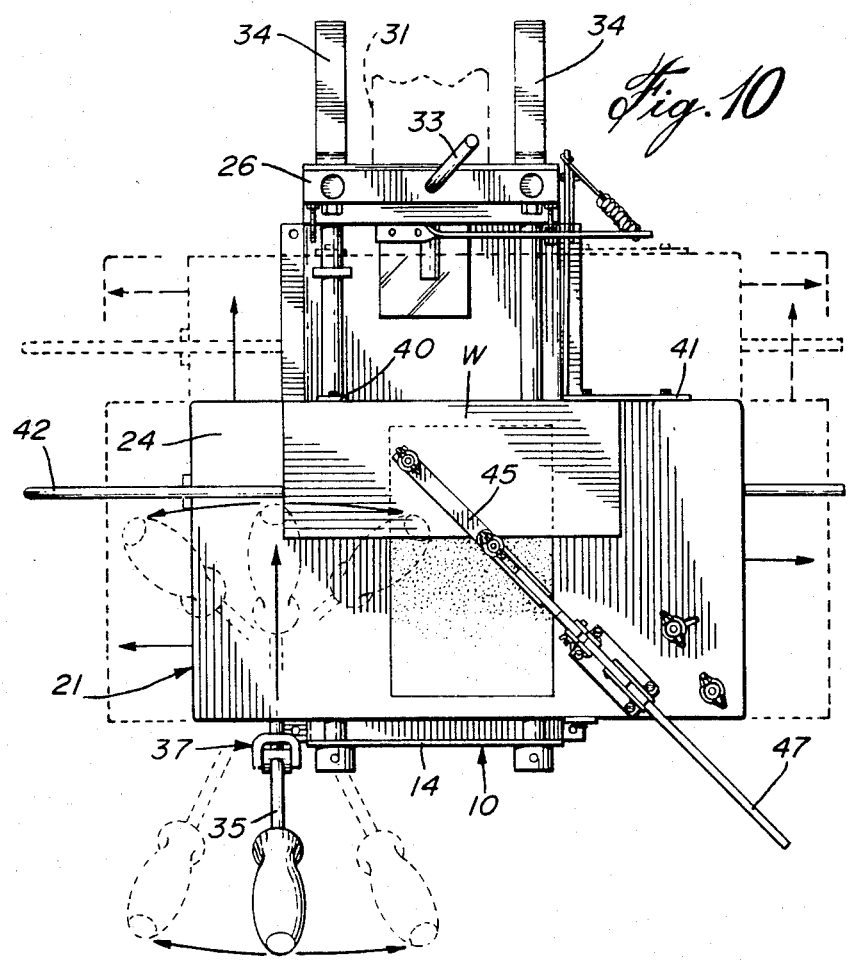
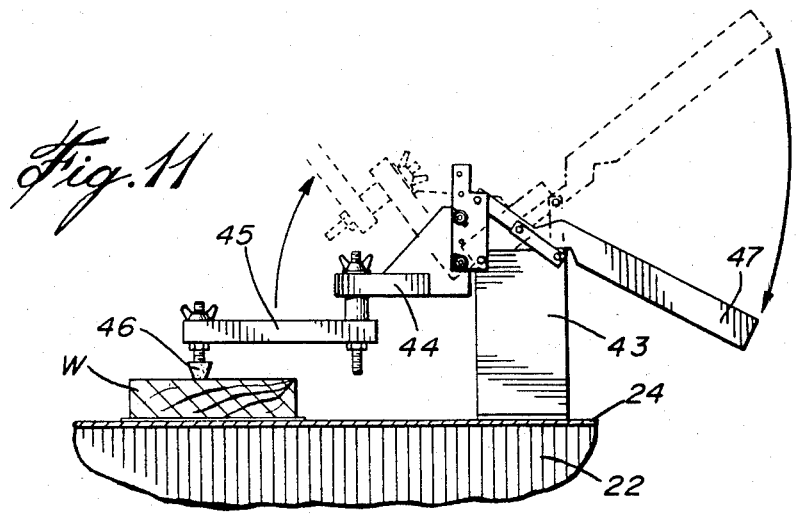

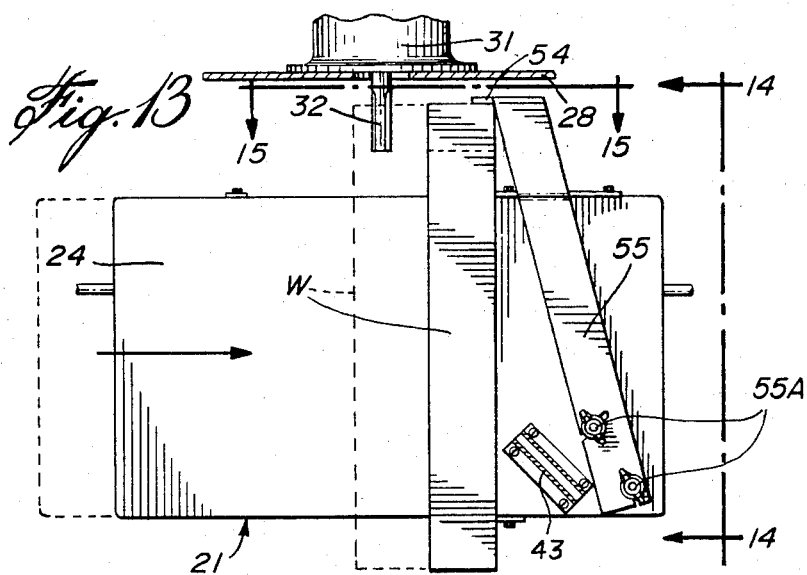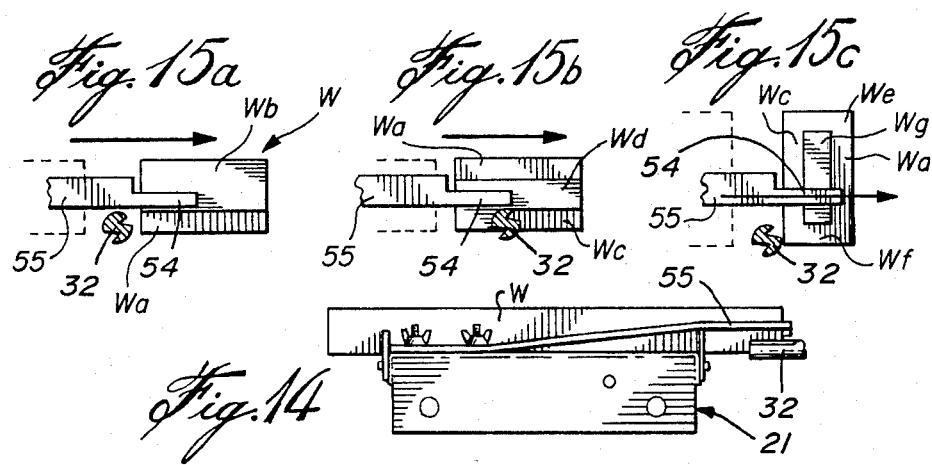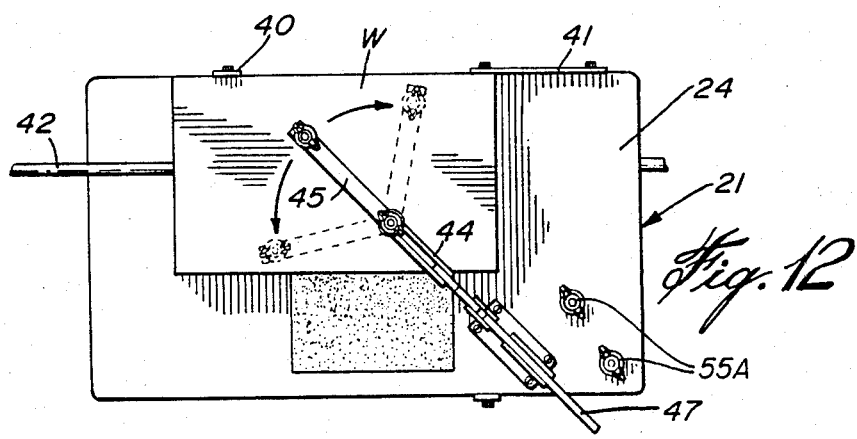

WOODWORKING PRESS

This invention relates to a woodworking machine of the press type, that is in which a cutting tool is fed into the work by pressure.

The U.S. Pat. No. 2,166,831, granted on July 18, 1939, defines a machine of the above type in which the movement of the work carriage with respect to the cutting tool of a router is produced in two orthogonal directions by two separate levers respectively. Besides, that patented woodworking machine is obviously made merely to produce mortises; there is no mention of it also featuring the ability to make tenons.

It is a general object of the present invention to provide a woodworking press that is particularly adapted to produce mortises and tenons.

It is another general object of the present invention to provide a woodworking press that is of relatively simple construction and operation and yet that is relatively improved functionally.

It is a more specific object of the present invention to provide a woodworking press that is adapted to rapidly produce both mortises and tenons and to perform other woodworking functions, such as drilling and other routing functions.

It is another object of the present invention to provide a woodworking press that is adapted to readily set the depth and the lengths of the cuts and to positively position a piece of wood to work on it, such as to cut a tenon.

It is a further object of the present invention to provide a woodworking press including a cutting tool that can readily be adjusted in height to allow convenient production of tenons.

The above and other objects and advantages of the present invention will be better understood with reference to the following detailed description of a preferred embodiment thereof which is illustrated, by way of example, in the accompanying drawings, in which:

FIG. 1 is a perspective view of a woodworking press according to the present invention;

FIG. 2 is a cross-section taken longitudinally and vertically of the woodworking press of FIG. 1;

FIGS. 3 and 4 are detailed views of a piece of wood in relation to the cutter of a router for a mortising operation;

FIG. 5 is a cross-section taken transversely and vertically through the woodworking press of FIG. 1;

FIGS. 6 and 7 are detail views of a piece of wood in relation to the cutter of a router for a mortising operation;

FIG. 8 is a side view of the same woodworking press now adapted to produce tenons on pieces of wood;

FIG. 9 is a detail view showing a cutter in mortising engagement in a piece of wood;

FIG. 10 is a top plan view of the press;

FIGS. 11 and 12 are a side elevation view and a top plan view of a wood-clamping system forming part of the woodworking press;

FIG. 13 is a plan view of the same woodworking press but in a configuration to produce tenons;

FIG. 14 is a side elevation view as seen along line 14—14 and in the direction of the corresponding arrows in FIG. 13; and FIGS. 15a, 15b, and 15c are sequential views of the cutting of a tenon as seen along line 15—15 in FIG. 13.

The illustrated woodworking press comprises a base 10, made of a bent sheet of metal to form a flat top 11, opposite lateral sides 12 downwardly depending from the flat top and each ending into a outwardly extending fixation flange 13. The flanges 13 are provided to conveniently and fixedly secure the whole machine on an appropriate workbench. The base 10 is also formed at its opposite end with a pair of upstanding flanges 14.

A pair of guide rods 15 extend longitudinally of the base 10 over its flat top 11 and are secured at their opposite ends into the upstanding flanges 14,14'.

A first carriage 16, also made of a bent sheet of metal, is slidably mounted on the guide rods 15. The first carriage 16 includes a flat top 17, a pair of downwardly-depending end flanges 18 and a pair of upstanding lateral flanges 19. The depending flanges 18 are slidably engaged on the guide rods 15 for sliding of the first carriage 16 along the same.

A second pair of guide rods 20 longitudinally extend transversely of the base, that is, orthogonally relative to the first pair of guide rods 15. The guide rods 20 extend over the flat top 17 and slidably through the upstanding lateral flanges 19 of the first carriage 16.

A second carriage 21, made of bent sheet metal, is secured to the guide rods 20 for slidable displacement with them. The second carriage 21 is formed with a pair of downwardly-depending opposite end flanges, 22' and a pair of narrower downwardly-depending opposite lateral flanges 23 relative to a flat top 24. The pair of guide rods 20 have their opposite ends secured to the end flanges 22, 22' respectively and, thus, bodily travel with the second carriage in an orthogonal direction relative to the direction defined by the first pair of guide rods 15.

A third pair of guide rods 25 are fixedly secured at their lower end to the first pair of guide rods 15 and upwardly project from them in a perpendicular direction relative to the first pair and to the second pair of guide rods. A crossbar 26 interconnects the upper end of the guide rods 25.

A third carriage 27, also made of bent sheet metal, is slidably mounted on the guide rod 25. The third carriage 27 includes a flat tool holder face 28 and a pair of rearwardly-extending flanges 29 slidably engaged on the guide rods 25 for up-and-down displacement and adjustment of the third carriage. The tool holder face 28 is formed with a circular aperture 30 and with holes to removably attach a router 31 against its back surface. Thus, the cutter 32 of the router 31 is horizontally disposed and forwardly projects from the tool holder face 28. The carriage 27 is displaceable and adjustable solely in an up and down fashion by an upwardly-projecting crank 33 having a screw-threaded stem threaded in the crossbar 26 and fixed to the top flange, such that, upon its rotation, the third carriage 27 and the router 31 are adjusted up or down. A pair of braces 34 join the rear end of the guide rods 15 and the guide rods 25 to firmly hold the latter in its vertical position and, thus, perpendicular to the other guide rods.

A single actuation arm 35 actuates both the first and the second carriages to slide them in either of the two directions defined by the guidebars 15 and 20. For that purpose, the lower end of the actuation arm 35 is universally pivoted to the base sides 12 at universal joint 36 and to the second carriage lateral flanges 23 at universal joint 37. The arm 35 is slidable endwise in the universal joint 37 to account for the varying distance between the two universal joints 36, 37 when the second carriage 21 moves relative to the base 10.

Adjustable stops 38 are mounted on the fore and aft guide rods 15 and similar adjustable stops 39 are mounted on the transverse guide rods 20 to set the limits of the displacement of each carriage 16, 21 respectively relative to the cutter 32. Each adjustable stop 38, 39 is conveniently made annular to slide along the corresponding guide rod with a corresponding setscrew to fix it in a desired position.

A pair of upstanding tongues 40 and 41 are secured against the rear flange 23 of the top carriage 21 to form abutments against which the proximate face of a board or piece of wood W will abut to be properly indexed relative to the cutter 32. In the transverse direction, proper and adjustable indexing is provided by a bent rod 42 extending transversely and adjustably through the end flanges 22 of the top carriage 21 and having one end standing over the carriage to abut the piece of wood W against it.

A clamp assembly is operatively mounted on the top carriage 21 by means of a bracket 43. That clamp assembly includes a clamping arm, made of an inner section 44 and an outer section 45. These sections are pivotally adjustable angularly relative to each other, such that the hold-down stud 46 at the outer end of section 45 and transversely thereof may be set at a desired position on the top face of the piece of wood W. An actuation arm 47 is pivoted both to the bracket 43 and to the section 44 of the clamping arm, whereby downward pivoting of the actuation arm clamps the stud 46 onto the piece of wood in toggle-lever action.

An L-shaped plexiglass guard 48 is carried by a bent arm 49 that is pivoted at 50 to the crossbar 26. A spring 51 is secured at its top end to the end of arm 49 opposite its bent portion and upwardly and retractively biases the guard 48. The bottom end of spring 51 is attached to a hook 51A which is itself connected at its bottom end to the rear end of a lever 52 that is pivoted to upstanding flanges 19 of the first carriage 16, so as to be pushed by it when it is displaced to an operative rearward position. Another lever 53, mounted to base side 12 and restrains the lever 52 to extend the spring 51, as shown in dotted lines in FIG. 8, when the first carriage has reached an operative rearward position. The guard 48 is therefore moved to an upper cutter tool clearing position in which arm 49 abuts a stop 49A on cross bar 26, when the workpiece W is worked upon by cutter 32, and is moved to a lower cutter embracing position to protect the user against the still rotating but not working cutter 32. Spring 51 maintains guard 48 in elevated position for all of the working positions of top carriage 21 which positions being at a varying distance from third carriage 27.

It will be readily understood that for mortising, the first carriage is moved rearward to engage the cutter 32 the desired depth into the piece of wood. This depth is determined by setting the stops 38 on the rods 15. The length of the mortise is determined by setting the stops 39 on the rods 20 and transversely pivoting the actuation arm 35 to displace laterally the top carriage 21 between those stops 39.

To make tenons, there is additionally provided an elongated guide 55, as shown in FIGS. 13 to 15, that is removably attached at its inner end by bolts and wing nuts 55A on the flat top 24 of the top carriage 21 and is provided at its outer end with a transverse abutment finger 54, said finger 54, together with the outer end portion of guide 55 which protrudes from top carriage 21 towards vertical carriage 27, are slightly above the cutter 32, such that the latter can pass freely under it. The tenon is made by first abutting the piece of wood against the finger 54 and transversely displacing the top carriage and thereafter sequentially rotating the piece of wood, such that the cutter transversely cuts the end of the piece of wood below to leave only a central projection, the tenon, as can be seen in FIGS. 15a, 15b, and 15c.

More specifically, in FIG. 15a, there is shown a workpiece which bottom of its end portion has been cut, at Wa, by cutter 32. The finger 54 abuts against the uncut portion Wb. The purpose of abutment finger 54 is thus to retain the workpiece W against further sliding thereof toward the router 31, which would increase the depth of cut. The depth of cut is adjusted by stops 38.

The workpiece shown in FIG. 15a is turned upside down and the opposite edge thereof is cut by cutter 32 at Wc in FIG. 15b. The remaining intermediate uncut portion, Wd, is still supported by finger 54 against movement of the workpiece toward router 31.

The workpiece of FIG. 15b is then rotated at right angle so that each top and bottom edges of its end portion is also cut, as indicated by letters We and Wf in FIG. 15c. The finger 54 always abuts against the remaining intermediate uncut portion, now Wg in FIG. 15c, which constitutes the tenon per se. This procedure which entails making the successive cuts under the eventual tenon Wg eliminates the necessity of adjusting the height of the cutter 32 after successive cuts.

It may be readily understood that the cutter 32 may be of any desired and known shape as currently used with a router to thus perform the same general routing operation. The cutter 32 may also be replaced by a drill to use the router as a drill driving mechanism. The router 31 is preferably of the portable type and may be detached from the press to be used elsewhere.

What I claim:

1. A woodworking press comprising a base, superposed lower and upper carriages slidably mounted on said base and on said lower carriage respectively for horizontal guided displacement at right angles one with respect to the other relative to said base, said upper carriage forming a horizontal work supporting surface, a single generally upright actuation arm pivoted to said base at its lower end about a first universal joint and to said top carriage about a second universal joint, said arm also longitudinally slidable relative to said second universal joint, actuation of said arm causing movement of said upper carriage in any horizontal direction, a pair of upright spaced support rods fixedly secured to said base, upwardly projecting therefrom and located exteriorly of the area of displacement of said upper and lower carriages, a top cross bar interconnecting the ends of said support rods, a third plate-like carriage slidably mounted on said support rods for vertical movement therealong, said third carriage having a back surface and a front surface, the latter facing towards said upper and lower carriages, said third carriage having an aperture made therein, a power-driven router removeably secured to said third carriage at the back surface thereof so as to be movable therewith, a horizontally disposed cutting tool operatively carried by said router and extending through said aperture of said third carriage and protruding from said front surface towards the upper and lower carriages, upright screw means extending through and screwed within said cross bar and rotatively attached to said third carriage at its lower end, and manually actuable means at the top end of said screw means exposed above said cross bar to rotate said screw means and adjust the height of said cutting tool relative to said work supporting surface.

2. A woodworking press as defined in claim 1, further including a cutting tool guard of L-shaped cross-section movable between operative and inoperative positions, said guard, in operative position, embracing said cutting tool by extending from said front surface of said third carriage upwardly along the side of said cutting tool and transversely across the top of said cutting tool to guard against contact with said tool while the latter is rotating, said guard, in said inoperative position, clearing said tool and disposed at a higher level than the latter, and means responsive to the movement of said upper carriage towards and away from said third carriage causing movement of said guard to said inoperative position during movement of said upper carriage towards said third carriage.

3. A woodworking press as defined in claim 2, wherein said lower carriage is guided for horizontal displacement in a direction towards and away from said third carriage and wherein said last named arm is pivoted intermediate its ends to said cross bar for movement in a plane parallel to said third carriage, said guard fixed to one end of said last named arm, a pair of upstanding levers pivotally interconnected at the top ends and pivotally connected to said base and to said lower carriage respectively at their lower ends, and a tension spring extending between and attached to the upper end of one of said levers and to the other end of said last named arm.

4. A woodworking press as defined in claim 1, further including a rigid guide removably attached at one end on the supporting surface of said upper carriage and including an elongated body extending toward said third carriage and having its opposite end portion protruding from said work supporting surface towards said third carriage, and a small endmost abutment finger extending transversely of the elongated body opposite end portion, the latter and said finger being upwardly shifted relative to said work supporting surface a distance sufficient for said cutting tool to engage that portion of a work piece abutting said finger which extends under said finger and said opposite end portion.

5. A woodworking press as defined in claim 2, further including a rigid guide removably attached at one end on the supporting surface of said upper carriage and including an elongated body extending toward said third carriage and having its opposite end portion protruding from said work supporting surface towards said third carriage, and a small endmost abutment finger extending transversely of the elongated body opposite end portion, the latter and said finger being upwardly shifted relative to said work supporting surface a distance sufficient for said cutting tool to engage that portion of a work piece abutting said finger which extends under said finger and said opposite end portion.

* * * * *